INVENTOR.
Clarence A. Ruggles
BY
Roland A Anderson
Attorney

Aug. 27, 1957     C. A. RUGGLES     2,803,885
GAUGING APPARATUS

Filed March 28, 1955     3 Sheets-Sheet 2

INVENTOR.
Clarence A. Ruggles
BY
*Roland A. Anderson*
Attorney

Aug. 27, 1957 C. A. RUGGLES 2,803,885
GAUGING APPARATUS

Filed March 28, 1955 3 Sheets-Sheet 3

INVENTOR.
Clarence A. Ruggles
BY

*Roland A. Anderson*

Attorney

United States Patent Office 2,803,885
Patented Aug. 27, 1957

2,803,885

GAUGING APPARATUS

Clarence A. Ruggles, China Lake, Calif., assignor to the United States of America as represented by the United States Atomic Energy Commission Application March 28, 1955, Serial No. 497,478

4 Claims. (Cl. 33—174)

The present invention relates generally to gauging apparatus, and more particularly to gauging means for measuring objects of generally arcuate cross-section which possess tapering edge surfaces. Such objects are useful for filling openings in generally domed articles and mating closely with complementary edges that form such openings. With such objects it is desirable to measure not only the side edges but also the concave arcuate surface to insure that it conforms to the curvature of adjacent surfaces of the article into which it is fitted.

An object of the present invention is to provide new and improved gauging means.

Another object of the invention is to provide improved gauging means which is particularly useful for measuring tapering or sloping edges of objects.

Another object of the invention is to provide improved gauging apparatus which embodies means for measuring a concave arcuate surface of an object.

Still another object of the invention is to provide new and improved gauging means for measuring sloping side edges of objects that embody edges of different length.

A further object of the invention is to provide improved gauging apparatus adapted to be utilized for measuring objects of different sizes.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention and various modifications thereof have been chosen for purposes of illustration and description. The preferred embodiment and the modifications are not intended to be exhaustive nor to limit the invention to the precise form disclosed. They are chosen and described in order to best explain the principles of the invention and their application in practical use to thereby enable others skilled in the art to best utilize the invention in various embodiments and modifications as are best adapted to the particular use contemplated.

In the accompanying drawings.

Figure 1:
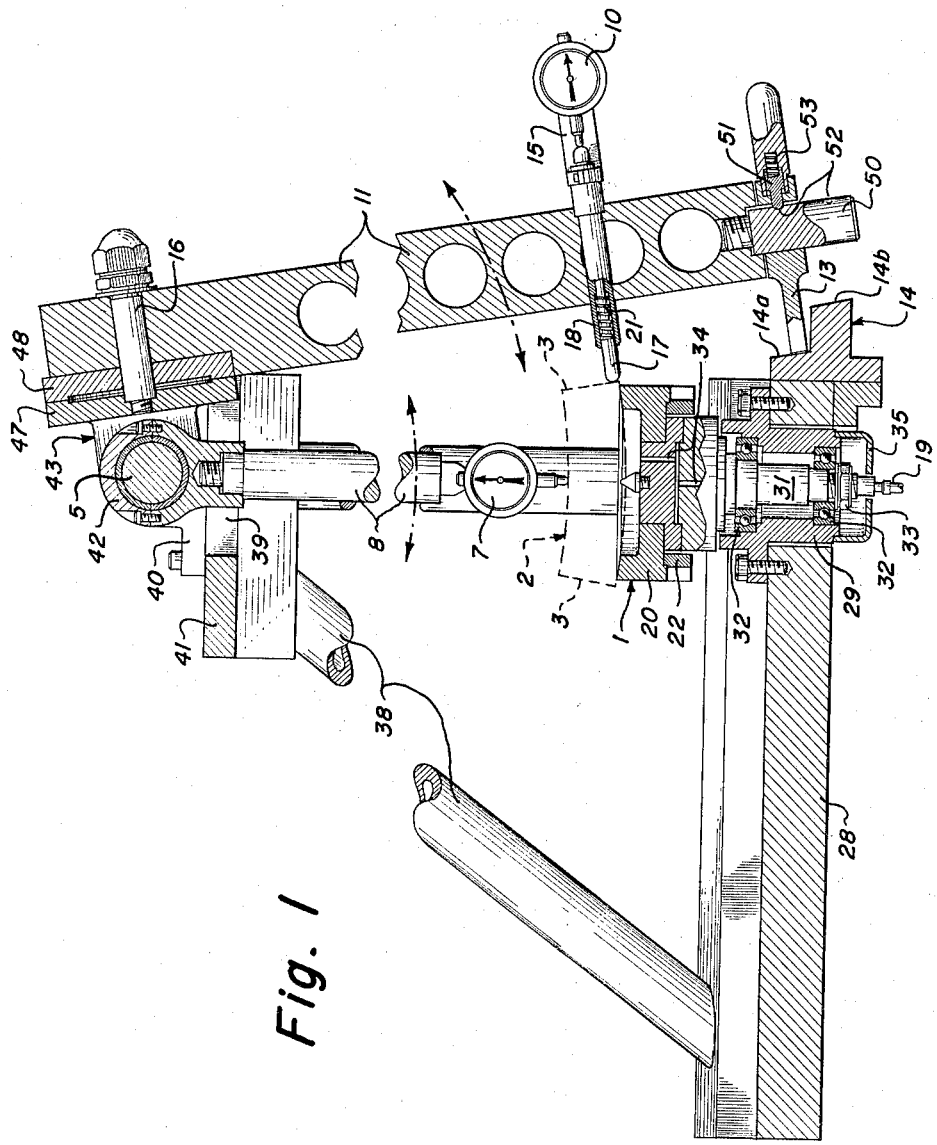
Fig. 1 is a side view, partly broken away and sectionalized showing a preferred embodiment of the invention.
Figure 2:
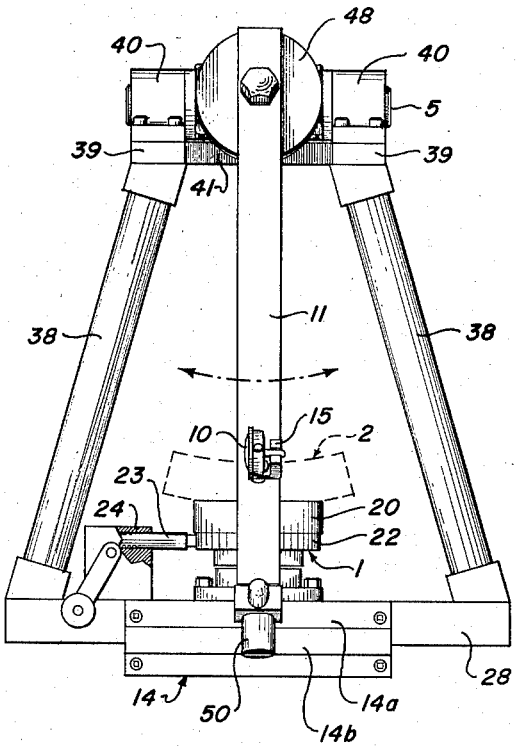
Fig. 2 is a front view, at a smaller scale, of the device shown in Fig. 1.
Figure 3:
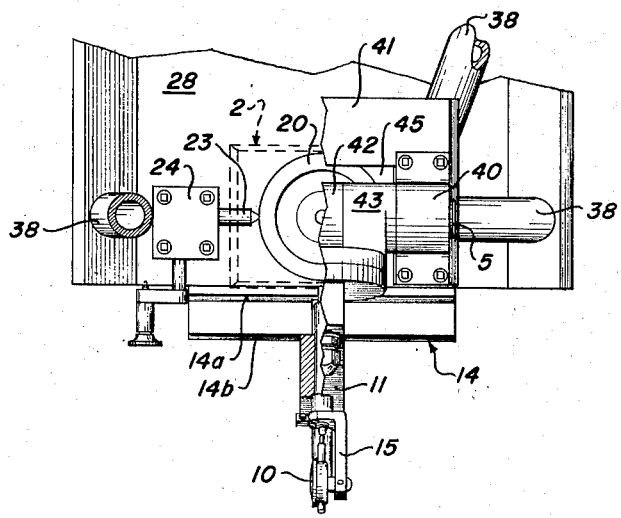
Fig. 3 is a fragmentary top plan view, partly in section, of the device shown in Figs. 1 and 2.
Figure 4:
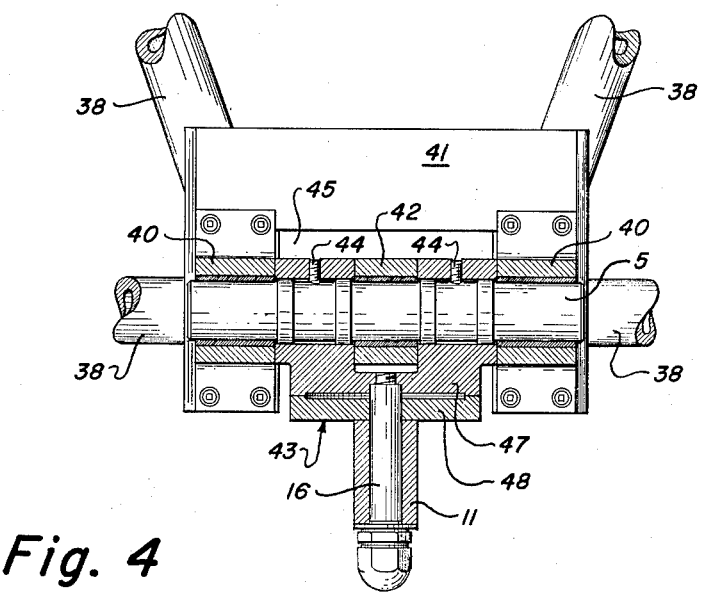
Fig. 4 is an enlarged sectional view illustrating features of a rotatable support shaft shown in Figs. 1 and 2.
Figure 5:
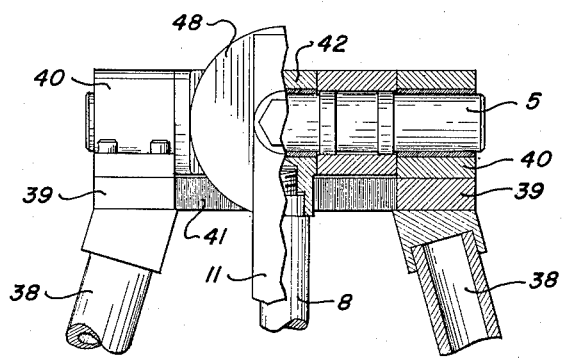
Fig. 5 is a partly broken away and sectionalized view of the shaft and associated parts shown in Fig. 4.

Described generally, the gauge of the present invention comprises a structure having at a lower part thereof an indexing turret 1 for supporting an object 2 and at an upper part thereof a rotatable support shaft 5, the rotational axis or center line of which is in alignment with the rotational axis of the indexing turret 1. As shown, the object 2 is of generally rectangular configuration and rests on the turret 1 with a concave surface thereon facing upwardly so that it may be gauged or measured by a dial indicator or the like 7 at the lower part of a pendent arm 8 that is rotatably supported by the shaft 5. Side edges 3 of the object 2 slope or taper toward the intersection of a center line through the pendent arm 8 and the shaft 5 and are adapted to be measured by a dial indicator 10 or the like carried by a swinging arm 11, the lower end of which has mounted thereon a support member 13 which bears at one end against a surface of a cam or resting plate 14; the arm 11 may be swung about a support pin 16 so that the end of a push rod 17, which is operatively connected with and serves to actuate the dial indicator 10, moves to and fro over an adjacent face 3 of an object located on the turret.

Preferably the dial indicator is initially adjusted by utilizing a standard or master object on the turret so that it gives a zero reading as the end of its push rod 17 moves to and fro over an adjacent tapering surface 3 of the master or standard object. The abutting end of support member 13, guiding surface of cam or plate 14, terminal end of push rod 17, and edge surface of the object being measured lie along a common plane or line which is coincident with these points or areas and the center line or rotational axis of the shaft 5.

An air or vacuum line 19 connects through appropriate turret passages with the interior of an object-supporting member or pad 20 so that air may be withdrawn from the interior of pad to assist in retaining an object thereon. In addition, a centering cone or pin is preferably carried by the turret for projecting into an appropriately shaped recess in the object to assist in accurately centering it on the turret. An appropriately shaped peripherally notched index plate 22 is carried by the turret for cooperating with indexing pin 23 of locking means 24 to lock the turret for accurate presentation and retention of the turret and an object with respect to the dial indicator or the like. The entire apparatus may be supported on an appropriate stand or table (not shown). The device will now be described in greater detail.

The turret means 1 is disposed within an opening of a base or bench plate member 28 and comprises a housing 29 bolted to the base 28 which contains a spindle 31 rotatably supported adjacent its upper and lower parts by bearings 32. Retaining nut 33 maintains the spindle assembled with the housing 29 and a cap 35 encloses the lower portion of the spindle and its bearings to minimize foreign matter getting into the bearings.

The upper part of the spindle 31 is provided with an enlarged portion for supporting the previously referred to indexing plate 22 and article supporting pad 20; these elements may be separately formed and assembled together by bolts, welding, or in any other suitable manner. The spindle 31 and indexing plate 22 contain conduits or passages 34 which communicate with the vacuum line 19. The object-supporting pad 20 may be made of any suitable material and its upwardly facing supporting surfaces are preferably of configuration conforming generally to that of the lower surface of an object 2 which is to be supported thereon.

Pairs of supporting columns 38 disposed at opposite sides of the base 28 are welded, bolted or otherwise secured adjacent their lower ends to the base 28 and project upwardly to support crossbars 39, to which they may be pinned and bolted or otherwise secured. The crossbars 39 are rigidly interconnected by a connecting member 41 and carry spaced bearings 40 for rotatably supporting the shaft 5. The latter shaft rotatably supports the pendent arm 8, which depends through recess 45 formed by crossbars 39 and connecting member 41, by means of a bearing member 42 which encircles the shaft adjacent its midportion. In addition, the shaft 5 rotatably supports the swinging arm 11 by means of a pivot head 43 shown fixedly secured to the shaft 5 by set screws 44. By this construction both the pendent arm 8 and the front arm 11 may swing in a plane generally perpendicular to the rotational axis of shaft 5, so that the dial indicator 7 on the arm 8 may move to and fro over the upwardly facing concave surface of an object 2, and so that the front arm 11 may move toward the object for contact between the object and the terminal end of push rod 17 which actuates the dial indicator 10. Movement of arm 11 and push rod 17 toward the object is, of course, limited by the cam or plate member 14.

In addition to its mounting for movement substantially perpendicular to the rotational axis of shaft 5 the front arm 11 is mounted on the pin 16 for movement generally parallel to the surface 3 of an object; this latter movement of the front arm 11 is facilitated by securing the pin 16 to the pivot head 43 and guiding its movement by a pair of cooperating plate or disc members 47 and 48, one of which is attached to or formed integral with the pivot head 43 and the other of which is secured to the front arm 11 so that annular mating surfaces adjacent their peripheries may slide over each other during swinging of the arm 11 so as to move the push rod and its associated dial indicator over the surface 3 of an object.

The lower end of the arm 11 carries the support member 13 which bears at one end thereof against an appropriate surface of plate 14, which is pinned, bolted or otherwise secured to the base member 28. As the arm is swung to and fro so as to move the indicator push rod 17 along the surface of an object, it is guided by the cooperating surfaces on the plate 14 and terminal end of support member 13.

While only a single push rod and associated indicator 10 is shown carried by the arm 11 for measuring an adjacent surface of an object, a plurality of such assemblies may be mounted adjacent each other on the arm 11 so that as the latter swings the plurality of push rods simultaneously move over the surface 3 of an object at different elevations to simultaneously actuate indicators; this simultaneous utilization of a plurality of push rods and indicators would be of advantage in instances where the object 2 is fairly thick and it is desired to measure it at a plurality of locations along its edges.

The push rod 17 may project into a casing 18 and be urged outwardly by a spring 21. The dial indicator may be clamped onto the push rod assembly by a clamp 15.

As shown, the cam or resting plate 14 is provided with two steps, 14a and 14b, for cooperating with the support member 13 so that the gauge may be used to measure objects of different sizes or to measure different length sides of a single object. For example, with the substantially rectangular object illustrated the upper or "small" step 14a guides the support member 13 and arm 11 during movement of the push rod 17 over surfaces of the object that are generally parallel to the major axis of the object and the lower or "large" step 14b guides the support member 13 and arm 11 during movement of the push rod 17 over object surfaces that are generally parallel to the minor axis of the object.

Adjustment of the arm supporting member 13 for cooperating with either one of the two steps 14a and 14b is facilitated by fitting it slidably over a guide pin 50 and retaining it in appropriate position thereon by a detent member 51 which projects into one or the other of recesses 52 in the guide pin. A spring 53 presses against the detent member 51 to yieldably retain it and the support member 13 in an adjusted position.

As previously mentioned, use of the gauge is facilitated by employing a master or standard (an accurate replica of the object to be gauged) to which the dial indicators or the like 7 and 10 are "zeroed." With this procedure the gauge is used to compare the objects with the standard or master. When the standard is positioned on the turret pad 20 and appropriately indexed for cooperating with the dial indicators and their associated push rods, the front arm 11 may be swung so that the push rod 17 is adjacent one end of a face 3 that is to be gauged and then the dial indicator set to read zero in the manner well known with such commercially available indicators. The arm 11 may then be swung to position the push rod 17 adjacent an opposite end of the same face to ascertain whether the indicator gives the same zero reading at that location. If not, the standard object may be turned on the support pad 20 until one half the difference of readings appears and the indicator may then be set at zero; thereafter the arm may be swung back to the initial position to ascertain whether it reads zero at this location. If not, the standard object may be turned in similar manner to one half the difference in reading and the procedure repeated until the indicator reads zero at positions opposite both ends of the face that is to be measured. The indicator 7 on the pendent arm 8 may then be set at zero. The standard object may then be removed and the object to be measured substituted for it on the turret, with the index pin 23 positioned in the appropriate notch or recess of the index plate 22. By swinging the arm 11 from side to side and turning the object on the pad 29 so that the indicator 10 reads the same at each side of the measured face, it will be ascertained that the object is properly positioned. The reading of the gauge may then be observed to ascertain whether the readings at the various faces is zero, to agree with the standard object or whether they differ therefrom and the extent of any differences. The turret may then be appropriately indexed to take readings at each face of the object. The pendent arm 8 may be swung to take measurements at various points on the concave surface of the object. Both the pendent arm 8 and front arm 11 may be swung aside so that objects may be readily positioned on and removed from the turret.

It will be seen that the present invention facilitates accurate measurement of size and angle of tapering edges of objects as well as the arcuately concaved surfaces of articles. The indicators may be passed over the surfaces to be measured by swinging the appropriate supporting arms and accurate measurements may be obtained with minimum effort. The indicators may be zeroed by utilizing a standard or master object, after which the object to be measured may be placed on the turret, centered and rapidly and accurately measured.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. A device of the character described comprising the combination of a base, cam means carried by the base for limiting the extent of movement of and guiding an arm, turret means rotatable about a vertical axis carried by the base above said cam means for holding an object to be measured and moving different object portions about the turret vertical rotational axis into and out of orientation with said cam means, support means extending from said base to a location above the turret means, a shaft carried by the support means above the turret means having a horizontal rotational axis in alignment with said vertical rotational axis of the turret means for rotatably supporting an arm, an arm having an upper portion adjacent said shaft and a lower portion normally resting against and guided by said cam means and adapted to support object-measuring means adjacent the turret means, and means carried by said shaft mounting the arm at its upper portion for rotation about said shaft toward and away from said vertical axis and said cam means in a direction generally radial of the turret means and also for rotation about an axis which is normal to said horizontal axis and intersects said horizontal and vertical axis to provide movement of the lower portion of the arm along the cam means.

2. A device as claimed in claim 1, in which the means mounting the arm includes a first guiding and bearing plate member carried by said shaft and rotatable about said longitudinal axis thereof, an additional guiding and bearing plate member secured to said arm and engaging the first plate member and rotatable with said arm about an axis normal to said longitudinal axis, and means retaining said first and additional plate members in engagement with each other.

3. A device as claimed in claim 2, in which at least one of said plate members is recessed adjacent its central portion to provide a projecting rim for engaging the other plate member to facilitate accurate movement of one along the other.

4. A device as claimed in claim 1, wherein an additional arm shorter than said first-mentioned arm is supported adjacent an upper end thereof by said shaft and has a longitudinal axis intersecting said vertical axis of the turret and said horizontal axis of the shaft for supporting object-surface measuring means and swingable in a direction generally radial of the turret means to swing said measuring means through an arc along an upper surface of an object on said turret means.

References Cited in the file of this patent

UNITED STATES PATENTS

| Number | Name | Date |
|---|---|---|
| 740,079 | Baumann | Sept. 29, 1903 |
| 1,037,460 | Ettl | Sept. 3, 1912 |
| 1,652,435 | Goodrich | Dec. 13, 1927 |
| 1,665,321 | Parker | Apr. 10, 1928 |
| 1,928,373 | Flatter | Sept. 26, 1933 |
| 2,010,144 | Dundon | Aug. 6, 1935 |
| 2,095,059 | Donnelly | Oct. 5, 1937 |
| 2,163,271 | Cook | June 20, 1939 |
| 2,351,246 | Walling | June 13, 1944 |
| 2,371,451 | Larson | Mar. 13, 1945 |
| 2,443,895 | Day | June 22, 1948 |
| 2,599,835 | Johnson | June 10, 1952 |
| 2,686,370 | Walker | Aug. 17, 1954 |
| 2,692,439 | Wilson | Oct. 26, 1954 |

OTHER REFERENCES

Machinery, page 794, June 1925.